(12) United States Patent
Melendez Valdez et al.

(10) Patent No.: US 11,566,463 B2
(45) Date of Patent: Jan. 31, 2023

(54) DOOR PRESENTER ACTUATOR FOR VEHICLE DOOR

(71) Applicant: Inteva Products, LLC, Troy, MI (US)

(72) Inventors: Luis Arturo Melendez Valdez, Chih. (MX); Hector Sanchez, Chih. (MX); Estrada Eduardo, Chih. (MX); Donald Michael Perkins, Warren, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 17/085,787

(22) Filed: Oct. 30, 2020

(65) Prior Publication Data

US 2022/0136308 A1  May 5, 2022

(51) Int. Cl.
  *E05F 11/00* (2006.01)
  *E05F 15/622* (2015.01)
  *B60J 5/04* (2006.01)

(52) U.S. Cl.
  CPC ........... *E05F 15/622* (2015.01); *B60J 5/0468* (2013.01); *E05Y 2201/434* (2013.01); *E05Y 2201/638* (2013.01); *E05Y 2201/702* (2013.01); *E05Y 2201/704* (2013.01); *E05Y 2201/71* (2013.01); *E05Y 2600/46* (2013.01); *E05Y 2900/531* (2013.01)

(58) Field of Classification Search
  CPC .......... E05B 81/38; E05B 81/14; E05B 81/06; E05B 81/70; E05B 81/77; E05C 17/203; E05C 17/003; E05C 17/006; E05F 15/614; E05F 15/41; E05F 15/611; E05F 15/616; E05F 15/622; E05F 2201/1696; E05Y 2201/702; E05Y 2201/216; E05Y 2201/434; E05Y 2900/531; E05Y 2201/426; E05Y 2201/686; E05Y 5/025; E05Y 2201/638; E05Y 2201/704; E05Y 2201/71; E05Y 2600/46; F16H 2025/2071; B60J 5/0468
  USPC ........................................... 49/276, 277, 278
  See application file for complete search history.

(56) References Cited

U.S. PATENT DOCUMENTS

| | | | |
|---|---|---|---|
| 2017/0059115 A1* | 3/2017 | Huang | F21S 45/50 |
| 2018/0051502 A1* | 2/2018 | Roos | E05B 81/14 |
| 2018/0179788 A1* | 6/2018 | Oxley | E05B 81/13 |
| 2019/0153768 A1* | 5/2019 | Termine | E05F 15/622 |
| 2019/0264474 A1* | 8/2019 | Ottino | E05B 81/36 |
| 2019/0277071 A1* | 9/2019 | Sabatini | B60Q 1/323 |
| 2019/0292818 A1* | 9/2019 | Cumbo | E05B 81/38 |
| 2020/0131836 A1* | 4/2020 | Ottino | E05B 81/14 |
| 2020/0270928 A1* | 8/2020 | Cumbo | E05F 15/41 |
| 2020/0318400 A1* | 10/2020 | Johann | E05B 81/20 |
| 2020/0332570 A1* | 10/2020 | Tomaszewski | E05B 81/34 |

(Continued)

OTHER PUBLICATIONS

First Chinese Office Action for Chinese Application No. 202122651481.0 dated Apr. 28, 2022; 2 Pages.

*Primary Examiner* — Chi Q Nguyen
(74) *Attorney, Agent, or Firm* — Cantor Colburn LLP

(57) ABSTRACT

A vehicle door presenter actuator, including: an extension bar that is driven outward from the door presenter actuator by a nut that threadingly engages a power screw operatively secured to a motor of the vehicle door presenter actuator; and a barrel cam that is pivoted into contact with a switch as a pin of the nut slides within a cam path of the barrel cam as the nut drives the extension bar outward from the vehicle door presenter actuator.

20 Claims, 6 Drawing Sheets

(56) References Cited

U.S. PATENT DOCUMENTS

| | | | |
|---|---|---|---|
| 2021/0301561 A1* | 9/2021 | Cumbo | E05B 81/14 |
| 2022/0025692 A1* | 1/2022 | Henes | E05F 15/614 |

\* cited by examiner

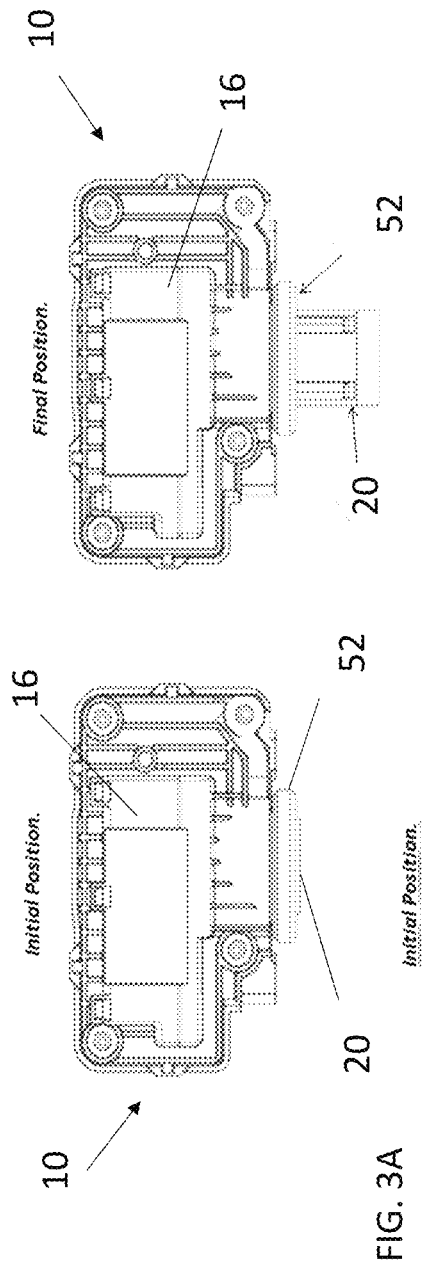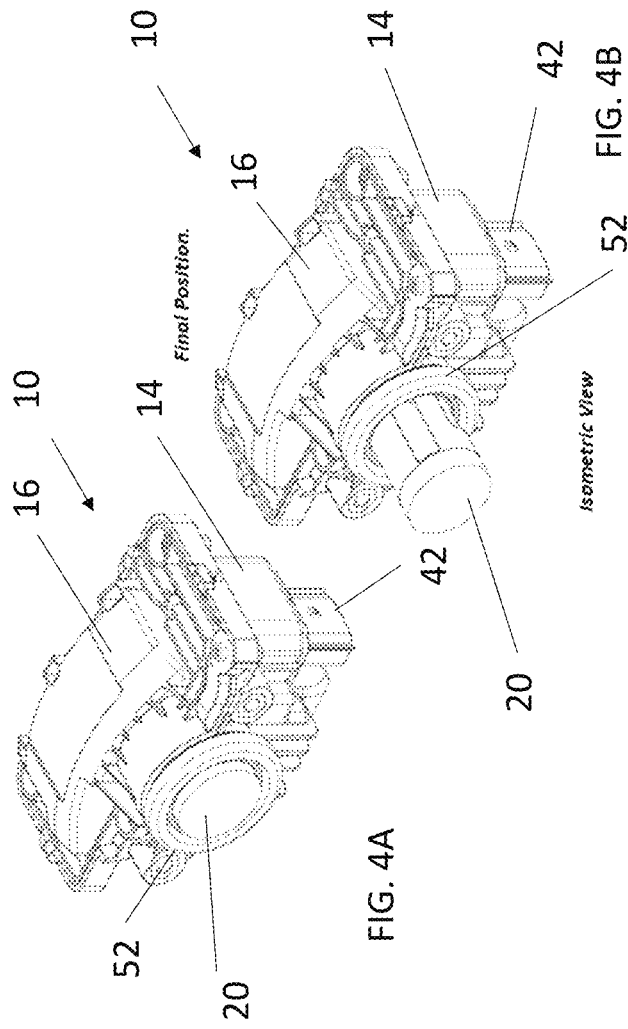

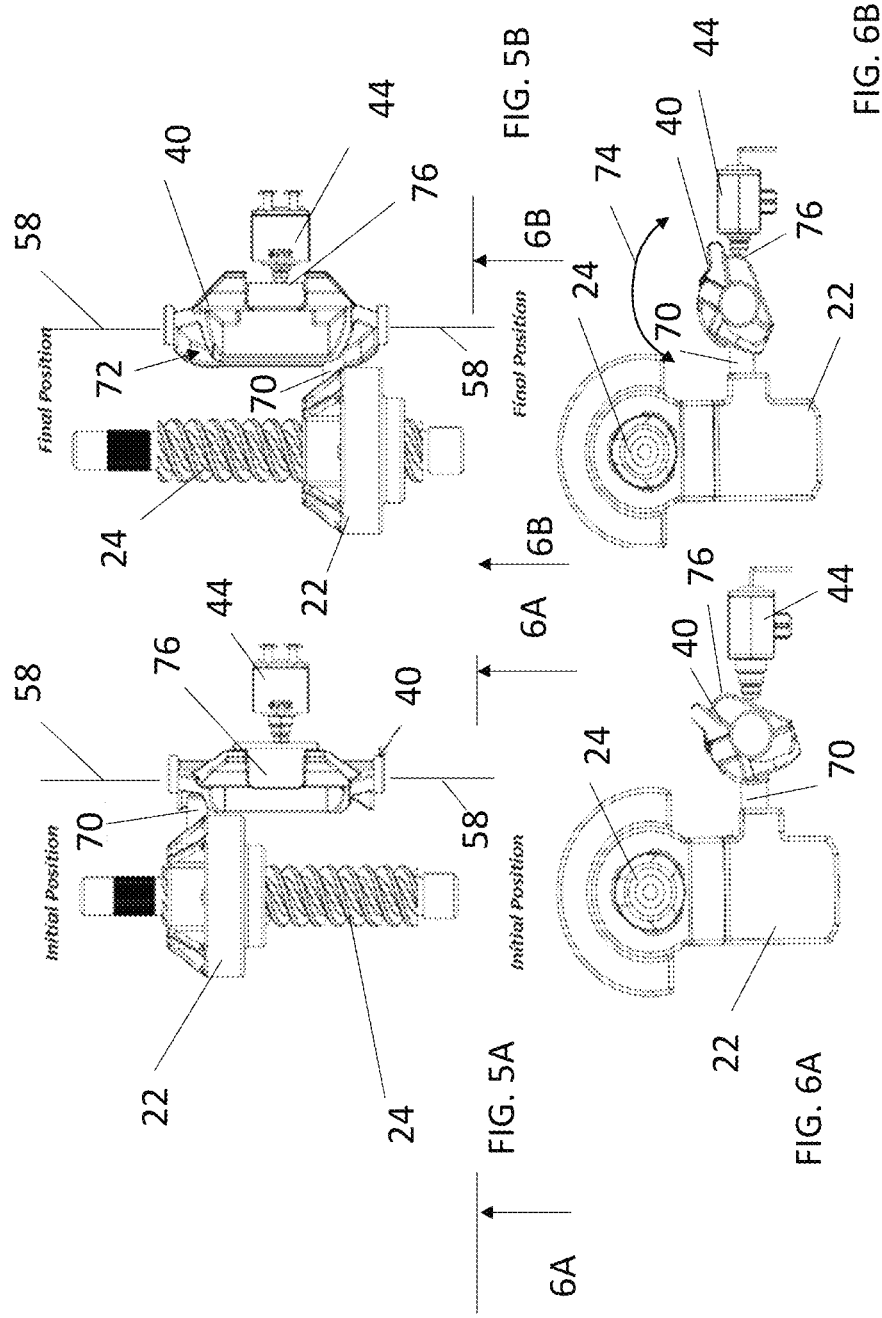

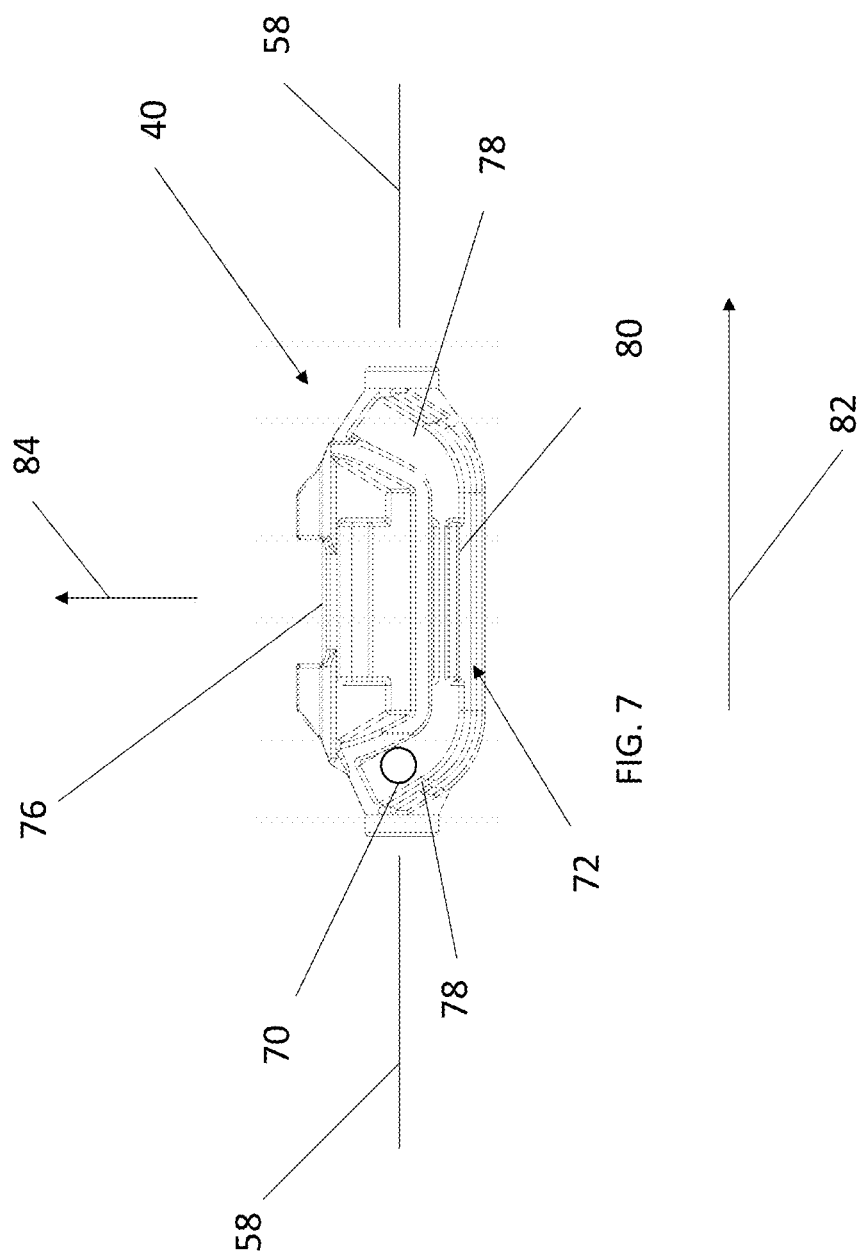

DOOR PRESENTER ACTUATOR FOR VEHICLE DOOR

BACKGROUND

Exemplary embodiments pertain to the art of vehicles, and more door presenters for vehicles.

Latch assemblies are known to releasably secure doors in a closed position. Operation of an inside door handle or an outside door handle releases the latch allowing the door to open. Subsequent closure of the door will automatically re-latch the latch.

Some latches (typically mounted on a vehicle door) have a latch bolt, typically in the form of a rotating claw which can be held in a closed position by a pivotally mounted pawl thereby retaining a striker (typically mounted on a door aperture) so as to hold an associated door closed.

Vehicle doors have "weather" seals typically around their periphery. These seals are made from elastomeric material and when the door is in the closed the weather seals are compressed therefore ensuring rain and dirt does not enter the vehicle. As will be appreciated, with the weather seals in a compressed condition, they tend to force the door open and this force is resisted by the pawl and claw.

Under normal conditions when the latch is initially opened the weather seals will push the door open enough to disengage the striker from the claw. However, under certain circumstances the door seals will not push the door to a position where the striker is fully disengaged from the claw. For example and when a temperature outside of the vehicle drops and the vehicle and parts of the weather seals are wet the water around the weather seals may freeze and the weather seals themselves may cool to below freezing. As such, the weather seals may be adhered to the door by ice and frost and thus the door may not move to an open position upon actuation of the vehicle door latch.

Therefore it is desirable to provide an actuator that will open the door when the temperatures around the vehicle create icing conditions that freeze the vehicle door to its door frame.

BRIEF DESCRIPTION

Disclosed is a vehicle door presenter actuator, including: an extension bar that is driven outward from the door presenter actuator by a nut that threadingly engages a power screw operatively secured to a motor of the vehicle door presenter actuator; and a barrel cam that is pivoted into contact with a switch as a pin of the nut slides within a cam path of the barrel cam as the nut drives the extension bar outward from the vehicle door presenter actuator.

In addition to one or more of the features described above, or as an alternative to any of the foregoing embodiments, rotational movement of the power screw will cause linear movement of the extension bar out of and into the vehicle door presenter actuator.

In addition to one or more of the features described above, or as an alternative to any of the foregoing embodiments, the power screw is fixedly secured to a spur gear that is rotationally driven by a motor via a worm of the motor that meshingly engages a first gear portion of a helical spur gear and a second gear portion of the helical spur gear meshingly engages the spur gear such that rotational movement of worm by the motor will cause rotational movement of the power screw about an axis.

In addition to one or more of the features described above, or as an alternative to any of the foregoing embodiments, the barrel cam is rotationally mounted to an electrical circuit carrier of the vehicle door presenter actuator.

In addition to one or more of the features described above, or as an alternative to any of the foregoing embodiments, the vehicle door presenter actuator includes a housing and a cover that define a cavity for receiving the extension bar, the nut and the power screw therein.

In addition to one or more of the features described above, or as an alternative to any of the foregoing embodiments, the cam path has a pair of curved portions located on opposite ends of a straight portion.

In addition to one or more of the features described above, or as an alternative to any of the foregoing embodiments, a metal insert is molded into the spur gear and the spur gear is formed from plastic and the power screw is secured to the metal insert.

In addition to one or more of the features described above, or as an alternative to any of the foregoing embodiments, the vehicle door presenter actuator includes a thrust plate that provides an end stop to contact an end of the power screw.

Also disclosed is a vehicle door, including: a door presenter actuator, the door presenter actuator including: an extension bar that is driven outward from the door presenter actuator by a nut that threadingly engages a power screw operatively secured to a motor of the door presenter actuator; and a barrel cam that is pivoted into contact with a switch as a pin of the nut slides within a cam path of the barrel cam as the nut drives the extension bar outward from the door presenter actuator.

In addition to one or more of the features described above, or as an alternative to any of the foregoing embodiments, rotational movement of the power screw will cause linear movement of the extension bar out of and into the door presenter actuator.

In addition to one or more of the features described above, or as an alternative to any of the foregoing embodiments, the power screw is fixedly secured to a spur gear that is rotationally driven by a motor via a worm of the motor that meshingly engages a first gear portion of a helical spur gear and a second gear portion of the helical spur gear meshingly engages the spur gear such that rotational movement of worm by the motor will cause rotational movement of the power screw about an axis.

In addition to one or more of the features described above, or as an alternative to any of the foregoing embodiments, the barrel cam is rotationally mounted to an electrical circuit carrier of the door presenter actuator.

In addition to one or more of the features described above, or as an alternative to any of the foregoing embodiments, further including a housing and a cover that define a cavity for receiving the extension bar, the nut and the power screw therein.

In addition to one or more of the features described above, or as an alternative to any of the foregoing embodiments, the cam path has a pair of curved portions located on opposite ends of a straight portion.

In addition to one or more of the features described above, or as an alternative to any of the foregoing embodiments, a metal insert is molded into the spur gear and the spur gear is formed from plastic and the power screw is secured to the metal insert.

In addition to one or more of the features described above, or as an alternative to any of the foregoing embodiments, a thrust plate is provided that provides an end stop to contact an end of the power screw.

Also disclosed is a method of operating a vehicle door presenter actuator, including: driving an extension bar outward from the door presenter actuator by a nut that threadingly engages a power screw operatively secured to a motor of the vehicle door presenter actuator; and pivoting a barrel cam into contact with a switch as a pin of the nut slides within a cam path of the barrel cam as the nut drives the extension bar outward from the vehicle door presenter actuator.

In addition to one or more of the features described above, or as an alternative to any of the foregoing embodiments, rotational movement of the power screw will cause linear movement of the extension bar out of and into the vehicle door presenter actuator.

In addition to one or more of the features described above, or as an alternative to any of the foregoing embodiments, the power screw is fixedly secured to a spur gear that is rotationally driven by a motor via a worm of the motor that meshingly engages a first gear portion of a helical spur gear and a second gear portion of the helical spur gear meshingly engages the spur gear such that rotational movement of worm by the motor will cause rotational movement of the power screw about an axis.

In addition to one or more of the features described above, or as an alternative to any of the foregoing embodiments, the barrel cam is rotationally mounted to an electrical circuit carrier of the vehicle door presenter actuator.

BRIEF DESCRIPTION OF THE DRAWINGS

The following descriptions should not be considered limiting in any way. With reference to the accompanying drawings, like elements are numbered alike:

FIG. 3A is a top view of the door presenter actuator according to the present disclosure in an initial stowed position;

FIG. 3B is a top view of the door presenter actuator according to the present disclosure in a final deployed position;

FIG. 4A is a perspective view of the door presenter actuator according to the present disclosure in an initial stowed position;

FIG. 4B is a perspective view of the door presenter actuator according to the present disclosure in a final deployed position;

FIG. 5A is a view of components of the door presenter actuator according to the present disclosure in an initial stowed position;

FIG. 5B is a view of components of the door presenter actuator according to the present disclosure in a final deployed position;

FIG. 6A is a view of components of the door presenter actuator according to the present disclosure in an initial stowed position along lines 6A-6A of FIG. 5A;

FIG. 6B is a view of components of the door presenter actuator according to the present disclosure in a final deployed position along lines 6B-6B of FIG. 5B;

FIG. 7 is a perspective view of a barrel cam of the door presenter actuator according to the present disclosure.

DETAILED DESCRIPTION

Figure 1:
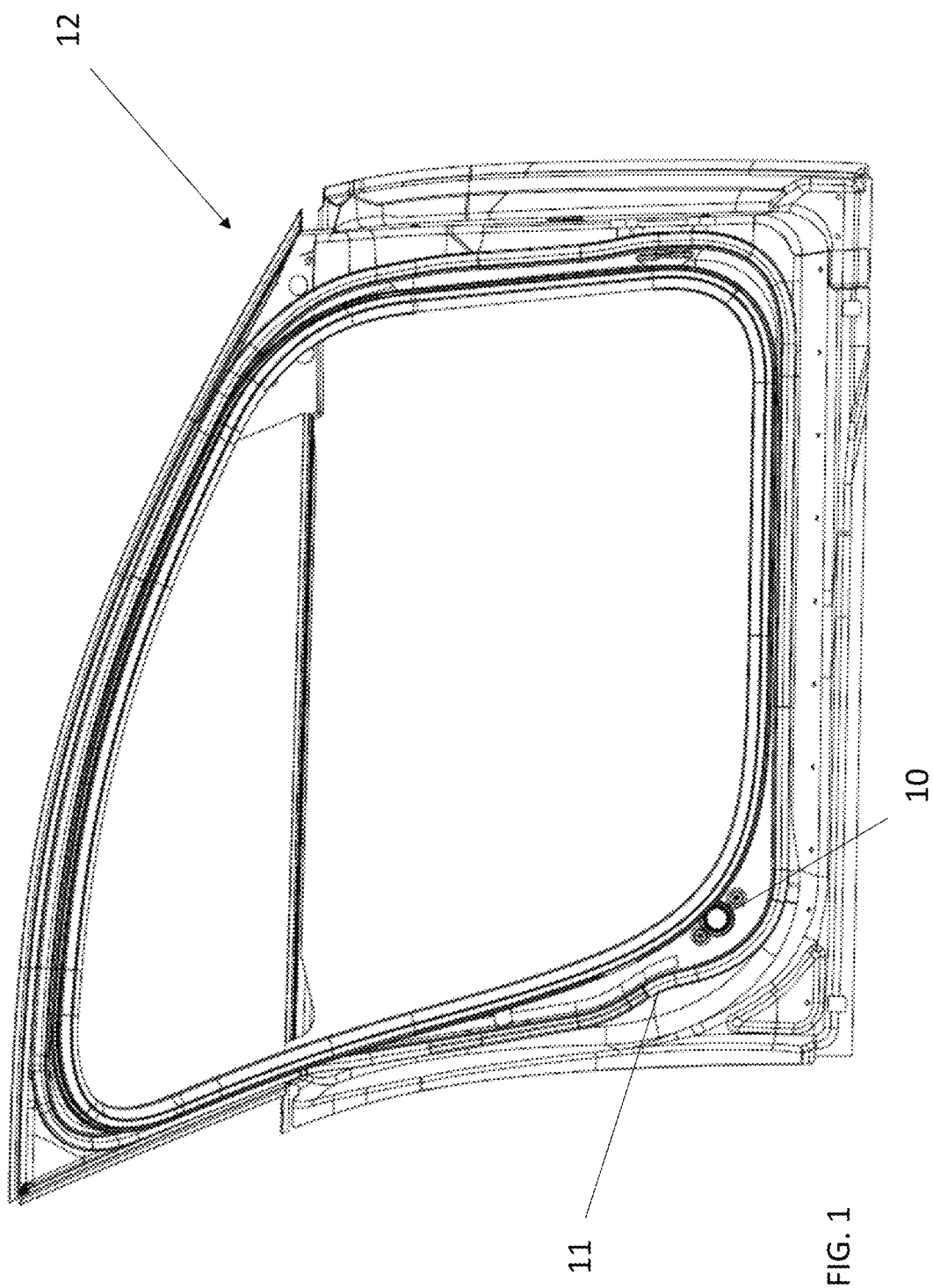
FIG. 1 is an interior view of a vehicle door with a door presenter actuator according to the present disclosure.

A detailed description of one or more embodiments of the disclosed apparatus and method are presented herein by way of exemplification and not limitation with reference to the Figures.

Disclosed herein is a door presenter actuator or vehicle door presenter actuator 10 for moving a vehicle door 12 away from a vehicle door frame (not shown) when a vehicle latch of the vehicle door 12 has been moved into an open position. Also illustrated is a seal 11, which as mentioned above may sometimes be frozen to the vehicle door frame.

The door presenter actuator 10 has a housing 14 and a corresponding cover 16. The cover 16 is configured to enclosed an inner cavity 18 of the housing 14. The door presenter actuator 10 has an extension bar or extension rod 20 that is driven outward from the housing 14 and cover 16 of the actuator 10 by a nut 22 that threadingly engages a power screw 24. In one embodiment, the nut 22 is fixed secured to the extension bar or extension rod 20 such that rotational movement of the power screw 24 will cause linear movement of the extension bar or extension rod 20 out of and into the actuator 10. The power screw 24 is fixedly secured to spur gear 26 that is rotationally driven by a motor 28 via a worm 30 of the motor 28 that meshingly engages a first gear portion 32 of a helical spur gear 34. A second gear portion 36 of the helical spur gear 34 meshingly engages the spur gear 26 such that rotational movement of worm 30 by the motor 28 will cause rotational movement of the power screw 24 about axis 38. Worm 30, helical 34 and spur gear 26 may collectively be referred to as a gear train.

Figure 2:
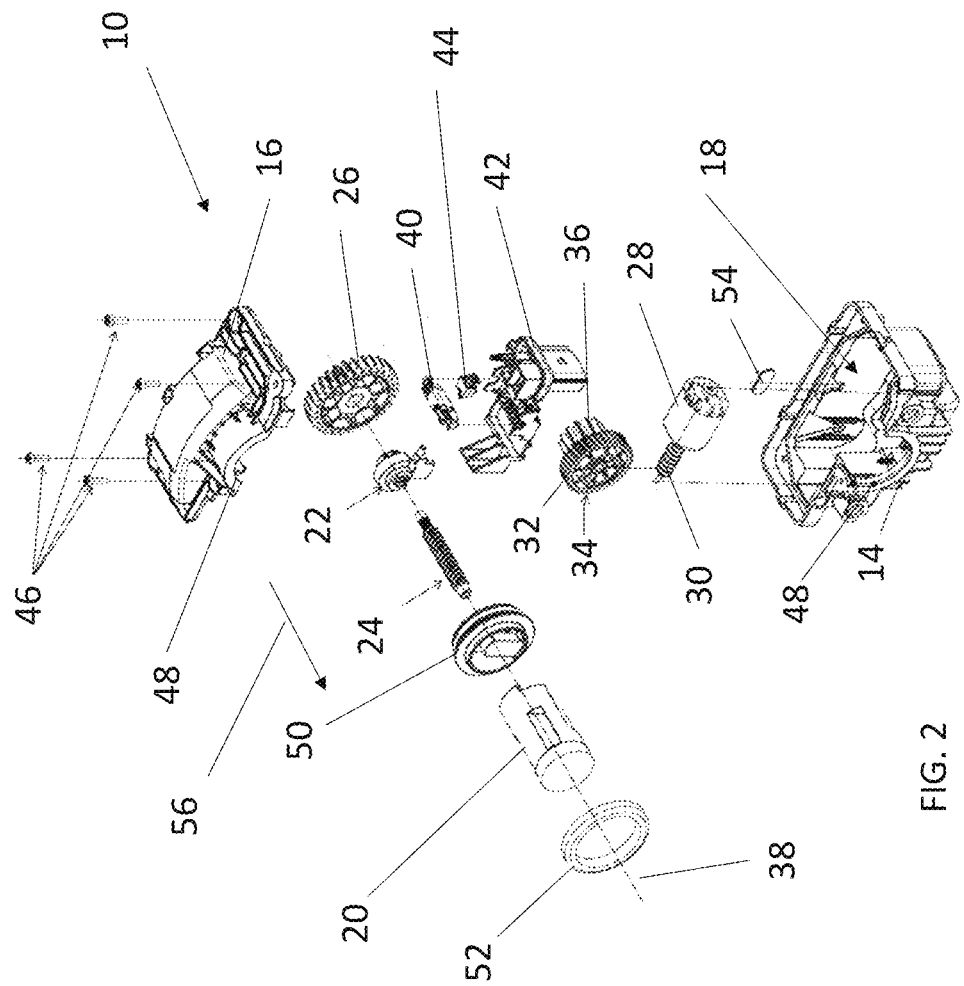
FIG. 2 is an exploded perspective view of a door presenter actuator according to the present disclosure.

Also shown in FIG. 2 is a barrel cam 40 that is rotationally or pivotally mounted to an electrical circuit carrier (ECC) 42. In one embodiment, the electrical circuit carrier (ECC) 42 is a modular component that can communicate with signals it receives from other components such as the vehicle latch in order to operate the motor 28 as well as the actuator 10. Also secured to the electrical circuit carrier (ECC) 42 is a switch 44 that is actuated as the barrel cam 40 rotates about its axis due to the movement of nut 22 along power screw 24.

In one non-limiting embodiment, cover 16 is secured to housing 14 via a plurality of screws 46. Cover 16 and housing 14 when secured together define an opening 48 that the extension bar or extension rod 20 extends into and out of the actuator 10 as the motor 28 is operated. Also illustrated in FIG. 2 is a seal o-ring 50, a sealing foam ring 52 and a thrust plate 54.

FIG. 3A is a top view of the door presenter actuator 10 according to the present disclosure in an initial or stowed position and FIG. 3B is a top view of the door presenter actuator 10 according to the present disclosure in a final or deployed position.

FIG. 4A is a perspective view of the door presenter actuator 10 according to the present disclosure in an initial stowed or position and FIG. 4B is a perspective view of the door presenter actuator 10 according to the present disclosure in a final deployed position. When the door presenter actuator 10 is in the initial or stowed position, the extension bar or extension rod 20 does not protrude or extend from the housing 14 of the actuator 10.

FIGS. 5A and 6A are views of components of the door presenter actuator 10 according to the present disclosure in an initial or stowed position and FIGS. 5B and 6B are views of components of the door presenter actuator 10 according to the present disclosure in a final or deployed position. FIG. 7 illustrates the barrel cam 40.

During operation of the door presenter actuator 10, motor initiated torque is applied to the gear train in order to rotate the power screw 24 in a first direction which will cause the nut 22 to linearly translate in the direction of arrow 56 along axis 38. This is due to rotational movement of the worm 30 in a first direction. This movement of the nut 22 in the direction of arrow 56 will cause the extension bar or extension rod 20 to extend from the actuator 10 until it reaches the final or deployed position. During this operation and when the actuator 10 is secured to the vehicle door 12 this movement will cause the vehicle door 12 to open it from the frame if there is any freezing between the seal 11 and/or the vehicle door 12 and the vehicle door frame.

In order to return the extension bar or extension rod 20 to the initial or stowed position motor initiated torque is applied to the gear train in order to rotate the power screw 24 in a second direction opposite to the first direction which will cause the nut 22 to linearly translate in a direction opposite to arrow 56 along axis 38. This is due to rotational movement of the worm 30 in second direction, which is opposite to the first direction. This movement of the nut 22 in the direction opposite of arrow 56 will cause the extension bar or extension rod 20 to retract back into the actuator 10 until it reaches the first or stowed position. The movement occurs after the extension bar 20 has been moved to the final or deployed position.

In order to determine the position of the extension bar or extension rod 20 and in order to rotate the power screw in either the first direction or the second direction switch 44 is operatively coupled to a controller that controls the operation of the motor 28. As such, actuation of the switch will control operation of the motor 28.

In order to actuate the switch 44 barrel cam 40 is rotationally or pivotally mounted to the ECC 42 for movement about its axis 58. When the nut 22 and the extension bar or extension rod 20 have been moved to the final or deployed position switch 44 is depressed and when the nut 22 and the extension bar or extension rod 20 have been moved to the initial or stowed position switch 44 is no longer depressed.

The rotational or pivotal movement of barrel cam 40 is caused by a pin or feature 70 that slides within a cam path 72 of barrel cam 40 such that as pin or feature 70 slides within cam path 72 rotational movement of the barrel cam 40 in the direction of arrows 74 occurs. During this movement a contact surface 76 or barrel cam 40 will contact switch 44.

Referring now to at least FIG. 7, the pin or feature 70 that slides within a cam path 72 is illustrated. The cam path 72 has a pair of curved portions 78 located on opposite ends of a straight portion 80. As such and as pin or feature 70 slides within cam path 72 in the direction of arrow 82 from the position is illustrated in FIG. 7 the barrel cam 40 will rotate upwardly in the direction of arrow 84 as barrel cam 40 rotates or pivots about axis 58. The rotational movement of the barrel cam 40 will cause surface 76 to actuate the switch in order to determine the position of the extension bar 20 (e.g., deployed or stowed) and thus whether the motor 28 should be stopped or reverse its operation.

For example and in the position illustrated in FIG. 7 the pin or feature 70 is in the curved portion 78 and surface 76 does not contact the switch 44. As the motor 28 is energized the pin or feature 70 slides form the curved portion 78 into the straight portion 80 and the switch 44 is actuated until the pin or feature 70 slides into the opposite curved portion 78 where the switch 44 is no longer actuated and the motor is deenergized due to the movement of the barrel cam and actuation of the switch. In one embodiment, the motor is deenergized by a body control module or electronic module (not shown) that controls the function of the actuator 10. Thereafter and in order to return the barrel cam 40 to the initial or stowed position the motor 28 is operated in a reverse direction by the body control module or electronic module until it reaches the position illustrated in FIG. 7 and the motor is again deenergized. In other words and during a vehicle door opening event the motor 28 energized and the extension bar or extension rod 20 protrudes or extends from the housing 14 of the actuator 10. During this movement the barrel cam 40 is rotated and switch 44 is actuated. Once the switch is no longer actuated due to the pin or feature 70 sliding into the opposite curved portion 78 from its position illustrated in FIG. 7 the motor 28 is deenergized and the extension bar or extension rod 20 is fully extended. Thereafter the motor 28 is rotated in an opposite direction to retract or stow extension bar or extension rod 20 back into the housing 14 and pin or feature 70 is returned to the position illustrated in FIG. 7. Movement of the pin or feature 70 from the position illustrated in FIG. 7 and back again is caused by first rotating the barrel cam 40 in the direction of arrow 84 and then back again by reaching the opposite curved portion 78 causing the motor 28 to stop and then operate in a reverse direction until pin or feature 70 moves in a direction opposite to arrow 82 and is back in the position illustrated in FIG. 7.

In one embodiment and in order to provide a robust securement of the power screw 24 to the spur gear 26 a metal insert 86 is molded into spur gear 26, which may be formed from plastic or any other suitable material. The end of the power screw 24 will have a shape to have an interference fit with a shape of a corresponding opening in the insert 86 of the spur gear 26.

Figure 8:
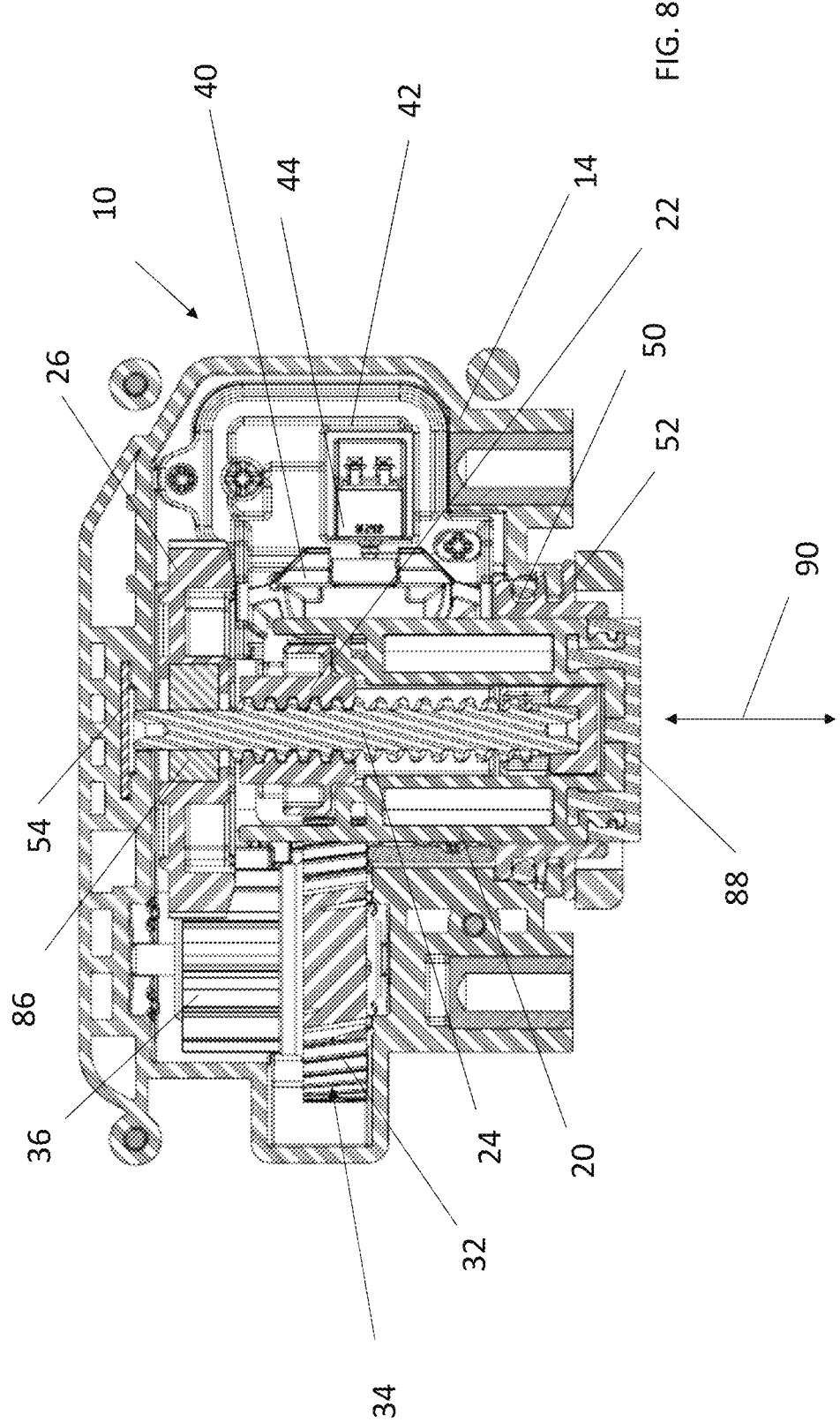
FIG. 8 is a cross sectional view of a portion of the door presenter actuator.

Also shown is the location of thrust plate 54 which provides an end stop to contact an end of power screw 24 as it is rotated by the gear train. FIG. 8 also illustrates the securement of nut 22 to extension bar 20. In addition and in one non-limiting embodiment, a tip portion 88 may be secured to extension bar or extension rod 20. During operation of the actuator 10, the motor 28 when energized rotates the helical spur gear 34 which in turn rotates the spur gear 26. The power screw 24 is fixedly secured to the spur gear so that the power screw 24 rotates with spur gear. As mentioned above, rotation of the power screw 24 causes movement of the nut 22 on power screw 24 which in turn causes the movement of the extension bar or extension rod 20 out of and into the housing of the actuator 10 in the directions of arrows 90. This is due to the fact that the nut 22 is fixedly secured to the extension bar or extension rod 20.

In FIG. 1 the position of the vehicle door presenter actuator or door presenter actuator 10 is illustrated. Of course, other locations for the vehicle door presenter actuator or door presenter actuator 10 are contemplated and the present disclosure is not intended to be limited to the locations illustrated in the attached FIGS.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle door presenter actuator, comprising:
   an extension bar that is driven outward from the vehicle door presenter actuator by a nut that threadingly engages a power screw operatively secured to a motor of the vehicle door presenter actuator; and
   a barrel cam that is pivoted into contact with a switch as a pin of the nut slides within a cam path of the barrel cam as the nut drives the extension bar outward from the vehicle door presenter actuator.

2. The vehicle door presenter actuator as in claim 1, wherein rotational movement of the power screw will cause linear movement of the extension bar out of and into the vehicle door presenter actuator.

3. The vehicle door presenter actuator as in claim 1, wherein the power screw is fixedly secured to a spur gear that is rotationally driven by the motor via a worm of the motor that meshingly engages a first gear portion of a helical spur gear and a second gear portion of the helical spur gear meshingly engages the spur gear such that rotational movement of the worm by the motor will cause rotational movement of the power screw about an axis.

4. The vehicle door presenter actuator as in claim 3, wherein a metal insert is molded into the spur gear and the spur gear is formed from plastic and the power screw is secured to the metal insert.

5. The vehicle door presenter actuator as in claim 1, wherein the barrel cam is rotationally mounted to an electrical circuit carrier of the vehicle door presenter actuator.

6. The vehicle door presenter actuator as in claim 1, further comprising a housing and a cover that define a cavity for receiving the extension bar, the nut and the power screw therein.

7. The vehicle door presenter actuator as in claim 1, wherein the cam path has a pair of curved portions located on opposite ends of a straight portion.

8. The vehicle door presenter actuator as in claim 1, further comprising a thrust plate that provides an end stop to contact an end of the power screw.

9. A vehicle door, comprising:
   a door presenter actuator, the door presenter actuator comprising:
   an extension bar that is driven outward from the door presenter actuator by a nut that threadingly engages a power screw operatively secured to a motor of the door presenter actuator; and
   a barrel cam that is pivoted into contact with a switch as a pin of the nut slides within a cam path of the barrel cam as the nut drives the extension bar outward from the door presenter actuator.

10. The vehicle door as in claim 9, wherein rotational movement of the power screw will cause linear movement of the extension bar out of and into the door presenter actuator.

11. The vehicle door as in claim 9, wherein the power screw is fixedly secured to a spur gear that is rotationally driven by a motor via a worm of the motor that meshingly engages a first gear portion of a helical spur gear and a second gear portion of the helical spur gear meshingly engages the spur gear such that rotational movement of the worm by the motor will cause rotational movement of the power screw about an axis.

12. The vehicle door as in claim 11, wherein a metal insert is molded into the spur gear and the spur gear is formed from plastic and the power screw is secured to the metal insert.

13. The vehicle door as in claim 9, wherein the barrel cam is rotationally mounted to an electrical circuit carrier of the door presenter actuator.

14. The vehicle door as in claim 9, further comprising a housing and a cover that define a cavity for receiving the extension bar, the nut and the power screw therein.

15. The vehicle door as in claim 9, wherein the cam path has a pair of curved portions located on opposite ends of a straight portion.

16. The vehicle door as in claim 9, further comprising a thrust plate that provides an end stop to contact an end of the power screw.

17. A method of operating a vehicle door presenter actuator, comprising:
   driving an extension bar outward from the vehicle door presenter actuator by a nut that threadingly engages a power screw operatively secured to a motor of the vehicle door presenter actuator; and
   pivoting a barrel cam into contact with a switch as a pin of the nut slides within a cam path of the barrel cam as the nut drives the extension bar outward from the vehicle door presenter actuator.

18. The method as in claim 17, wherein rotational movement of the power screw will cause linear movement of the extension bar out of and into the vehicle door presenter actuator.

19. The method as in claim 17, wherein the power screw is fixedly secured to a spur gear that is rotationally driven by a motor via a worm of the motor that meshingly engages a first gear portion of a helical spur gear and a second gear portion of the helical spur gear meshingly engages the spur gear such that rotational movement of the worm by the motor will cause rotational movement of the power screw about an axis.

20. The method as in claim 17, wherein the barrel cam is rotationally mounted to an electrical circuit carrier of the vehicle door presenter actuator.

* * * * *